(12) United States Patent
Mascaro et al.

(10) Patent No.: US 9,983,859 B2
(45) Date of Patent: May 29, 2018

(54) METHOD AND SYSTEM FOR DEVELOPING AND DEPLOYING DATA SCIENCE TRANSFORMATIONS FROM A DEVELOPMENT COMPUTING ENVIRONMENT INTO A PRODUCTION COMPUTING ENVIRONMENT

(71) Applicant: Intuit Inc., Mountain View, CA (US)

(72) Inventors: Massimo Mascaro, San Diego, CA (US); Joseph Cessna, San Diego, CA (US); Jonathan Lunt, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 61 days.

(21) Appl. No.: 15/142,650

(22) Filed: Apr. 29, 2016

(65) Prior Publication Data

US 2017/0315791 A1 Nov. 2, 2017

(51) Int. Cl.
*G06F 9/45* (2006.01)
*G06F 9/445* (2018.01)

(52) U.S. Cl.
CPC . *G06F 8/51* (2013.01); *G06F 8/60* (2013.01)

(58) Field of Classification Search
CPC .................................................. G06F 8/51
See application file for complete search history.

(56) References Cited

U.S. PATENT DOCUMENTS

| | | |
|---|---|---|
| 6,922,488 B2 | 7/2005 | Mastrianni et al. |
| 6,973,418 B1 | 12/2005 | Kirshenbaum |
| 7,788,137 B1 | 8/2010 | Tifford |
| 8,090,794 B1 * | 1/2012 | Kilat ................. G06F 17/30867 709/203 |
| 8,190,499 B1 | 5/2012 | McVickar |
| 8,407,113 B1 | 3/2013 | Eftekhari et al. |

(Continued)

FOREIGN PATENT DOCUMENTS

WO WO 2016/039779 3/2016

*Primary Examiner* — Hang Pan
(74) *Attorney, Agent, or Firm* — Hawley Troxell Ennis & Hawley LLP; Philip McKay

(57) ABSTRACT

A method and system facilitates the development of data science transformations in one programming language and the deployment of the data science transformations in another programming language, according to one embodiment. The method and system preserves relationships, functions, configurations, and characteristics between combinations of data transformations, according to one embodiment. The preservation of the relationships, functions, configurations, and characteristics is enabled by developing and providing a set of low-level (e.g., atomic) transformations that enable users to build their own models, libraries, and configurations into macro-transformations (e.g., conglomerate transformations), according to one embodiment. Deploying the data science transformations into production computing environments is useful for providing or supporting a number of types of software services, such as, predicting user behavior, customizing user experiences, supporting marketing initiatives, providing empirically-backed recommendations, predicting user preferences for software interactions, and/or otherwise exposing patterns that are identified from historical and transactional data, according to one embodiment.

22 Claims, 8 Drawing Sheets

(56) References Cited

U.S. PATENT DOCUMENTS

| | | |
|---|---|---|
| 8,490,018 B2 | 7/2013 | Carter et al. |
| 8,768,313 B2 | 7/2014 | Rodriguez |
| 8,806,444 B1 | 8/2014 | Podgorny et al. |
| 9,355,650 B2 | 5/2016 | Dimitriadis et al. |
| 9,378,065 B2 | 6/2016 | Shear et al. |
| 9,444,824 B1 | 9/2016 | Balazs et al. |
| 9,648,171 B1 | 5/2017 | Eftekhari et al. |
| 2002/0152457 A1* | 10/2002 | Jahnke ............... G06F 8/315 717/139 |
| 2006/0155632 A1 | 7/2006 | Cherkas et al. |
| 2006/0294084 A1 | 12/2006 | Patel et al. |
| 2008/0071703 A1 | 3/2008 | Evans |
| 2008/0127127 A1* | 5/2008 | Chitgupakar ............ G06F 8/51 717/137 |
| 2008/0147494 A1 | 6/2008 | Larson |
| 2009/0106178 A1 | 4/2009 | Chu |
| 2009/0313086 A1 | 12/2009 | Lee et al. |
| 2011/0264569 A1 | 10/2011 | Houseworth et al. |
| 2012/0109792 A1 | 5/2012 | Eftekhari et al. |
| 2013/0268468 A1 | 10/2013 | Vijayaraghavan et al. |
| 2013/0282539 A1 | 10/2013 | Murray |
| 2014/0067518 A1 | 3/2014 | McGovern |
| 2014/0068600 A1 | 3/2014 | Ashok et al. |
| 2014/0122381 A1 | 5/2014 | Nowozin |
| 2014/0201045 A1 | 7/2014 | Pai et al. |
| 2014/0359261 A1 | 12/2014 | Collins et al. |
| 2015/0227962 A1 | 8/2015 | Wical et al. |
| 2016/0012350 A1 | 1/2016 | Narayanan et al. |
| 2016/0098804 A1 | 4/2016 | Mascaro et al. |
| 2016/0103667 A1 | 4/2016 | Chen et al. |
| 2016/0247239 A1 | 8/2016 | Houseworth et al. |
| 2017/0090893 A1* | 3/2017 | Aditya .............. G06F 17/30569 |

\* cited by examiner

```
import hippo
r = hippo.strings.Match('hello')
s1 = hippo.source.Constant('world')
s2 = hippo.source.Constant('goodbye')
x = hippo.control.Ternary(
    conditional=r,
    true=s1,
    false=s2
)
```

```
In [7]: from tests.patent import *
In [8]: print x
In [16]: Chain() {
15:   Merge() {
13:     Chain() {
0:       Match(regex='hello')
3:       Cast(dtype=<type 'int'>)
5:       Cast(dtype=<type 'str'>)
12:      Rename(rename='switch')
       }
8:     Chain() {
1:       Constant(value='world')
7:       Rename(rename='1')
       }
10:    Chain() {
2:       Constant(value='goodbye')
9:       Rename(rename='0')
       }
14:    _Multiplexer(switch='switch')
     }
   }
```

506  500  502  504

```
In [9]: import pandas
In [10]: input = pandas.Series(['hello', 'holle', 'what', 'hello'])
In [11]: print input
0    hello
1    holle
2    what
3    hello
dtype: object
In [12]: output = x.fit_transform(input)
| 2016-03-02 13:11:32,722 | DEBUG | Chain        | fitting 16: Chain() transform
| 2016-03-02 13:11:32,722 | DEBUG | Merge        | fitting 15: Merge() transform
| 2016-03-02 13:11:32,723 | DEBUG | Chain        | fitting 13: Chain() transform
| 2016-03-02 13:11:32,723 | DEBUG | Match        | fitting 0: Match(regex='hello') transform
| 2016-03-02 13:11:32,723 | DEBUG | Match        | computing 0: Match(regex='hello') transform
| 2016-03-02 13:11:32,723 | DEBUG | Cast         | fitting 3: Cast(dtype=<type 'int'>) transform
| 2016-03-02 13:11:32,724 | DEBUG | Cast         | computing 3: Cast(dtype=<type 'int'>) transform
| 2016-03-02 13:11:32,724 | DEBUG | Cast         | fitting 5: Cast(dtype=<type 'str'>) transform
| 2016-03-02 13:11:32,724 | DEBUG | Cast         | computing 5: Cast(dtype=<type 'str'>) transform
| 2016-03-02 13:11:32,725 | DEBUG | Rename       | fitting 12: Rename(rename='switch') transform
| 2016-03-02 13:11:32,725 | DEBUG | Rename       | computing 12: Rename(rename='switch') transform
| 2016-03-02 13:11:32,725 | DEBUG | Chain        | fitting 8: Chain () transform
| 2016-03-02 13:11:32,725 | DEBUG | Constant     | fitting 1: Constant(value='world') transform
| 2016-03-02 13:11:32,725 | DEBUG | Constant     | computing 1: Constant(value='world') transform
| 2016-03-02 13:11:32,726 | DEBUG | Rename       | fitting 7: Rename (rename='1') transform
| 2016-03-02 13:11:32,726 | DEBUG | Rename       | computing 7: Rename(rename='1') transform
| 2016-03-02 13:11:32,726 | DEBUG | Chain        | fitting 10: Chain() transform
| 2016-03-02 13:11:32,726 | DEBUG | Constant     | fitting 2: Constant(value='goodbye') transform
| 2016-03-02 13:11:32,726 | DEBUG | Constant     | computing 2: Constant(value='goodbye') transform
| 2016-03-02 13:11:32,726 | DEBUG | Rename       | fitting 9: Rename(rename='0') transform
| 2016-03-02 13:11:32,727 | DEBUG | Rename       | computing 9: Rename(rename='0') transform
| 2016-03-02 13:11:32,735 | DEBUG | _Multiplexer | fitting 14: _Multiplexer(switch='switch') transform
| 2016-03-02 13:11:32,748 | DEBUG | _Multiplexer | computing 14: _Multiplexer(switch='switch') transform
```

FIG. 5A     TO FIG. 5B

METHOD AND SYSTEM FOR DEVELOPING AND DEPLOYING DATA SCIENCE TRANSFORMATIONS FROM A DEVELOPMENT COMPUTING ENVIRONMENT INTO A PRODUCTION COMPUTING ENVIRONMENT

BACKGROUND

Many data scientists do not have the tools they need to operate more efficiently because the tools they need to perform their tasks are currently unavailable to the public at large. Data scientists leverage large quantities of historical data to develop statistical models that can be used to predict future user behaviors, events, and outcomes. Because the data scientists' statistical models can be integrated into software services to perform system-critical functions, any hindrances in the development and deployment of statistical model updates can be inconvenient and even disastrous to the software services provider and to the customers of the software services.

A long-standing need in the data science community exists to facilitate the development, sharing, and deployment of their statistical models. Unfortunately, the available tools that are best-suited for developing statistical models are poorly suited for deploying the models into the production environments that the models will be operating in. As a remedy, data scientists can use third party tools to translate source code from a development language into a production language and/or into an executable file for a production environment, however, the use of third party tools comes with a big drawback.

The problem with deploying code through third party tools is that there is limited or no visibility or assurances that the translation process is being performed correctly and/or is maintaining the intricate relationships between the data transformations defined by the source code. A similar problem exists with production environments that directly accept the source code in the development language. The risks associated with having a black box translate source code for direct deployment of software services to tens of millions of potential customers is so great that data scientist are typically not permitted to release their models directly to a production environment. As a result, data scientists' models are carefully tested, translated, and/or otherwise handled by software engineers. The detriment of this model of deployment is the introduction of latency between model development and deployment. Further complicating matters, some of the production computing environments have to be manually configured to get the resources of the production computing environment to support the operation of the models.

Because the work of data scientists can impact the functionality of complex software services, any hindrances, difficulties, or redundant steps in developing and deploying model updates can become roadblocks to deploying updates, fixes, or otherwise resolving the potential revenue generating hindrances to proper operation of a software service.

What is needed is a method and system for developing and deploying data science transformations from a development computing environment into a production computing environment, according to various embodiments.

SUMMARY

Embodiments of the present disclosure include methods and systems that resolve many of the long-standing deficiencies in the development and deployment tools available for data scientists. Indeed, the disclosed method and systems can be packaged into one or more software systems that would be marketable to any data scientist who develops data transformations in popular development computing environments, to facilitate deploying the data transformations into various production computing environments (e.g., a cloud service), according to one embodiment. Existing tools for deploying data transformations burden data scientists with mediocre results while requiring duplicative efforts, when the data scientists deploy complicated data science models and other data transformations. The disclosed development system, and corresponding methods, fill a long-standing need for enabling data transformation (e.g., predictive or other statistical models) deployment into production computing environments, directly from development computing environments, according to one embodiment. Deploying the data transformations into production computing environments is useful for providing or supporting a number of types of software services, such as, predicting user behavior, customizing user experiences, supporting marketing initiatives, providing empirically-backed recommendations, predicting user preferences for software interactions, and/or otherwise exposing patterns that are identified from historical and transactional data, according to one embodiment.

The disclosed embodiments includes a development system for developing and deploying data science transformations from a development computing environment into a production computing environment, according to one embodiment. The development system preserves relationships, functions, configurations, and characteristics between combinations of data transformations, according to one embodiment. The preservation of the relationships, functions, configurations, and characteristics is enabled by developing and providing a set of low-level (e.g., atomic) transformations that enable users to build their own models, libraries, and configurations into one or more macro-transformations (e.g., larger conglomerate transformations), according to one embodiment.

The set of low-level transformations are defined and maintained in a hybrid library that associates transformations in one programming language (e.g., Python) with corresponding transformations in another programming language (e.g., Java, JSON, JavaScript, a proprietary language, etc.), according to one embodiment. The development system uses the hybrid library to translate source code in a development programming language into source code and/or executable code in a production programming language, so that data scientists and other developers can define macro-transformations in a development programming language that are compiled into macro-transformations for the production programming language, according to one embodiment.

Compiling and/or translating one source code into another source code using the described hybrid library reduces the risk of relationship, functionality, and/or configuration losses experienced using traditional tools that convert one executable file into another, according to one embodiment. One of the issues with using existing solutions to translate executable code from a development programming language (e.g., Python) into a production environment programming language (e.g., JSON, Java, etc.) is that some of the configuration details for complicated data transformations is lost in translation, resulting in deployed models and data transformations that do not function as developed, tested, and/or intended, according to one embodiment. The development circumvents these issues by corresponding each low-level transformation in one language (the development computing environment language) with an equivalent low-level transformation in another language (the production computing environment language), according to one embodiment.

The development system converts a high-level language (e.g., Python) into a domain specific language, according to one embodiment. A domain specific language is a language that enables functionality within one or more particular domains or production environments. By importing the hybrid library into the development programming language (and/or interface) and referencing low-level transformations in the hybrid library with, for example hybrid library operators, data scientists can use the development system to generate macro-transformations that are operable in a target domain, e.g., the production computing environment, according to one embodiment.

The disclosed development system facilitates the development of data transformations (e.g., analytics models) by enabling the encapsulation of low-level translations, according to one embodiment. The low-level transformations are atomic transformations that are irreducible units or that are nearly irreducible units (with respect to data transformations) within the development programming language, according to one embodiment. The atomic transformations are logically combined together into classes, modules, and/or libraries using operators in the hybrid library to reference particular atomic transformations, according to one embodiment. Because the operators that reference the atomic transformations can be combined together in series, in parallel, and/or in a variety of conditional combinations of serial and parallel connections, developers can encapsulate one or more macro-transformations for use by other developers for creating more complicated macro-transformations, according to one embodiment. Unlike existing solutions/tools, the disclosed hybrid library and/or the development system preserves the relationships, functionality, and characteristics of the macro-transformation, even after compilation or translation into another language, according to one embodiment.

The development system also enables the retention of polymorphic attributes of macro-transformations, according to one embodiment. The macro-transformation is the combination of multiple atomic transformations, including the logical connections, operations, state-based operations, and/or conditional operations associated with the combination of the multiple atomic transformations, according to one embodiment. Polymorphic properties generally relate to operations and/or transformations that perform differently when used in different scenarios and/or under different conditions, according to one embodiment. Because the development programming language is captured at its fundamental, base, and/or atomic level building blocks, the algorithms, functions, and/or packages used in the development source code (to define the macro-transformation) are preserved during compiling and are leveraged to generate source code in the production programming language, according to one embodiment.

The development system performs a number of operations to enable developing and applying data science transformations from a development computing environment into a production computing environment, according to one embodiment. Some of the operations include receiving first transformations defined in a first programming language, receiving second transformations defined in a second programming language, associating the first transformations with the second transformations in a data structure, defining a macro-transformation in the first programming language, and compiling the macro-transformation to generate source code for the macro-transformation in the second programming language, according to one embodiment. The development system deploys the source code or executable code for the macro-transformation in the second programming language to one or more computing systems that represent a production computing environment, according to one embodiment. In the production computing environment, one or more computing systems receive user data or software system data, apply the macro-transformations to the user data and/or software system data, and provide personalized user experiences and/or other statistical information useful for improving the operation of the one or more software systems, according to one embodiment. These and other embodiments are disclosed in more detail below.

By providing a development system for developing and deploying data science transformations from a development computing environment into a production computing environment, implementation of embodiments of the present disclosure allows for significant improvement to the fields of data analytics, user experience personalization, electronic tax return preparation, financial software systems, data collection, and data processing, according to one embodiment. As one illustrative example, by providing a development system for developing and deploying data science transformations from a development computing environment into a production computing environment, embodiments of the present disclosure allow data scientists and other developers to develop and deploy transformations with fewer processing cycles and less communications bandwidth because the developers are able to generate the target files from a single command (e.g., "compile") rather than using one or more additional compiler or conversion tools. Fewer processing cycles and less communications bandwidth is also used because the developers can skip, potentially redundant, steps for configuring target/production computing environments by embedding resource configuration settings in the hybrid library so that the configuration settings are generating when the source code is compiled. This reduces processing cycles and communications bandwidth because the developers do not need to access and/or manipulate the target/production computing environments, which are generally accessed through remote network connections. As a result, embodiments of the present disclosure allow for improved processor performance, more efficient use of memory access and data storage capabilities, reduced communication channel bandwidth utilization, and therefore faster communications connections.

BRIEF DESCRIPTION OF THE DRAWINGS

FIGS. 5A and 5B are an example of a functional diagram that illustrates an example of applying a hybrid library to convert a data transformation in one programming language into a data transformation in another programming language, in accordance with one embodiment.

Figure 1:
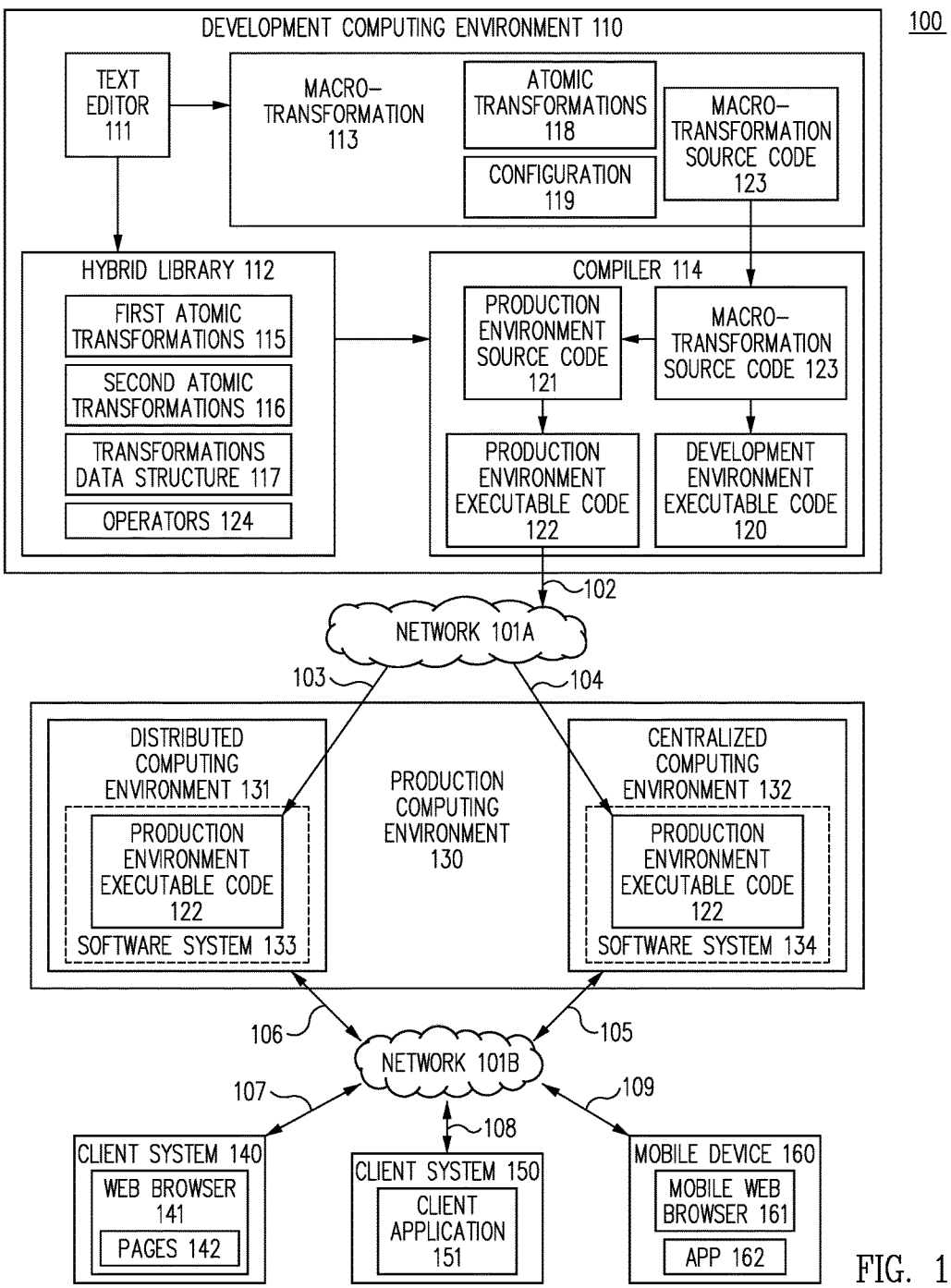
FIG. 1 is a block diagram of an example of a development system for data transformations, in accordance with one embodiment.

Common reference numerals are used throughout the FIGs. and the detailed description to indicate like elements. One skilled in the art will readily recognize that the above FIGs. are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIGs., which depict one or more exemplary embodiments. Embodiments may be implemented in many different forms and should not be construed as limited to the embodiments set forth herein, shown in the FIGs., and/or described below. Rather, these exemplary embodiments are provided to allow a complete disclosure that conveys the principles of the invention, as set forth in the claims, to those of skill in the art.

The INTRODUCTORY SYSTEM and the PROCESS AND HARDWARE ARCHITECTURE sections herein describe systems and processes suitable for developing and deploying data science transformations from a development computing environment into a production computing environment, according to various embodiments.

Introductory System

Herein, a software system can be, but is not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data, from one or more sources and/or has the capability to analyze at least part of the data.

As used herein, the term software system includes, but is not limited to the following: computing system implemented, and/or online, and/or web-based, personal and/or business tax preparation systems; computing system implemented, and/or online, and/or web-based, personal and/or business financial management systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; and various other personal and/or business electronic data management systems, services, packages, programs, modules, or applications, whether known at the time of filing or as developed later.

Specific examples of software systems include, but are not limited to the following: TurboTax™ available from Intuit, Inc. of Mountain View, Calif.; TurboTax Online™ available from Intuit, Inc. of Mountain View, Calif.; QuickBooks™, available from Intuit, Inc. of Mountain View, Calif.; QuickBooks Online™, available from Intuit, Inc. of Mountain View, Calif.; Mint™, available from Intuit, Inc. of Mountain View, Calif.; Mint Online™, available from Intuit, Inc. of Mountain View, Calif.; and/or various other software systems discussed herein, and/or known to those of skill in the art at the time of filing, and/or as developed after the time of filing. Each of the examples of software systems by include one or more supporting software systems that provide one or more services to support all or part of the operation of one or more of the examples of software systems, according to one embodiment.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the term "production environment", "production computing environment", "computing environment", and "development computing environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given development computing environment and/or production computing environment can include, but is not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets within one or more cloud or traditional computing environments.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience" includes not only a user session, interview process, interview process questioning, and/or interview process questioning sequence, but also other user experience features provided or displayed to the user such as, but not limited to, interfaces, images, assistance resources, backgrounds, avatars, highlighting mechanisms, icons, and any other features that individually, or in combination, create a user experience, as discussed herein, and/or as known in the art at the time of filing, and/or as developed after the time of filing.

Herein, the term "party," "user," "client," and "customer" are used interchangeably to denote any party and/or entity that interfaces with, and/or to whom information is provided by, the disclosed methods and systems described herein, and/or a person and/or entity that interfaces with, and/or to whom information is provided by, the disclosed methods and systems described herein, and/or a legal guardian of person and/or entity that interfaces with, and/or to whom information is provided by, the disclosed methods and systems described herein, and/or an authorized agent of any party and/or person and/or entity that interfaces with, and/or to whom information is provided by, the disclosed methods and systems described herein. For instance, in various embodiments, a user can be, but is not limited to, a person, a commercial entity, an application, a service, and/or a computing system.

As used herein, the term "analytics model" or "analytical model" denotes one or more individual or combined algorithms or sets of equations that describe, determine, and/or predict characteristics of or the performance of a datum, a data set, multiple data sets, a computing system, and/or multiple computing systems. Analytics models or analytical models represent collections of measured and/or calculated behaviors of attributes, elements, or characteristics of data and/or computing systems. One type of analytics models are predictive models that determine a likelihood of a particular condition, at least partially based on an analysis of multiple data samples. The term "analytics model" is used interchangeably with "statistical model".

As used herein, the term "executable code" denotes a set of instructions that can executed directly by a computer's central processing unit ("CPU") and/or instructions that a software interpreter can translate into machine code. In one embodiment, executable code is machine code.

Process and Hardware Architecture

Embodiments of the present disclosure include methods and systems that resolve many of the long-standing deficiencies in the development and deployment tools available for data scientists. Indeed, the disclosed method and systems can be packaged into one or more software systems that would be marketable to any data scientist who develops data transformations in popular development computing environments, to facilitate deploying the data transformations into various production computing environments (e.g., a cloud service), according to one embodiment. Existing tools for deploying data transformations burden data scientists with mediocre results while requiring duplicative efforts, when the data scientists deploy complicated data science models and other data transformations. The disclosed development system, and corresponding methods, fill a long-standing need for enabling data transformation (e.g., predictive or other statistical models) deployment into production computing environments, directly from development computing environments, according to one embodiment. Deploying the data transformations into production computing environments is useful for providing or supporting a number of types of software services, such as, predicting user behavior, customizing user experiences, supporting marketing initiatives, providing empirically-backed recommendations, predicting user preferences for software interactions, and/or otherwise exposing patterns that are identified from historical and transactional data, according to one embodiment.

The disclosed embodiments include a development system for developing and deploying data science transformations from a development computing environment into a production computing environment, according to one embodiment. The development system preserves relationships, functions, configurations, and characteristics between combinations of data transformations, according to one embodiment. The preservation of the relationships, functions, configurations, and characteristics is enabled by developing and providing a set of low-level (e.g., atomic) transformations that enable users to build their own models, libraries, and configurations into one or more macro-transformations (e.g., larger conglomerate transformations), according to one embodiment.

The set of low-level transformations are defined and maintained in a hybrid library that associates transformations in one programming language (e.g., Python) with corresponding transformations in another programming language (e.g., Java, JSON, JavaScript, a proprietary language, etc.), according to one embodiment. The development system uses the hybrid library to translate source code in a development programming language into source code and/or executable code in a production programming language, so that data scientists and other developers can define macro-transformations in a development programming language that are compiled into macro-transformations for the production programming language, according to one embodiment.

Compiling and/or translating one source code into another source code using the described hybrid library reduces the risk of relationship, functionality, and/or configuration losses experienced using traditional tools that convert one executable file into another, according to one embodiment. One of the issues with using existing solutions to translate executable code from a development programming language (e.g., Python) into a production environment programming language (e.g., JSON, Java, etc.) is that some of the configuration details for complicated data transformations is lost in translation, resulting in deployed models and data transformations that do not function as developed, tested, and/or intended, according to one embodiment. The development circumvents these issues by corresponding each low-level transformation in one language (the development computing environment language) with an equivalent low-level transformation in another language (the production computing environment language), according to one embodiment.

The development system converts a high-level language (e.g., Python) into a domain specific language, according to one embodiment. A domain specific language is a language that enables functionality within one or more particular domains or production environments. By importing the hybrid library into the development programming language (and/or interface) and referencing low-level transformations in the hybrid library with, for example hybrid library operators, data scientists can use the development system to generate macro-transformations that are operable in a target domain, e.g., the production computing environment, according to one embodiment.

The disclosed development system facilitates the development of data transformations (e.g., analytics models) by enabling the encapsulation of low-level translations, according to one embodiment. The low-level transformations are atomic transformations that are irreducible units or that are nearly irreducible units (with respect to data transformations) within the development programming language, according to one embodiment. The atomic transformations are logically combined together into classes, modules, and/or libraries using operators in the hybrid library to reference particular atomic transformations, according to one embodiment. Because the operators that reference the atomic transformations can be combined together in series, in parallel, and/or in a variety of conditional combinations of serial and parallel connections, developers can encapsulate one or more macro-transformations for use by other developers for creating more complicated macro-transformations, according to one embodiment. Unlike existing solutions/tools, the disclosed hybrid library and/or the development system preserves the relationships, functionality, and characteristics of the macro-transformation, even after compilation or translation into another language, according to one embodiment.

The development system also enables the retention of polymorphic attributes of macro-transformations, according to one embodiment. The macro-transformation is the combination of multiple atomic transformations, including the logical connections, operations, state-based operations, and/or conditional operations associated with the combination of the multiple atomic transformations, according to one embodiment. Polymorphic properties generally relate to operations and/or transformations that perform differently when used in different scenarios and/or under different conditions, according to one embodiment. Because the development programming language is captured at its fundamental, base, and/or atomic level building blocks, the algorithms, functions, and/or packages used in the development source code (to define the macro-transformation) are preserved during compiling and are leveraged to generate source code in the production programming language, according to one embodiment.

The development system performs a number of operations to enable developing and applying data science transformations from a development computing environment into a production computing environment, according to one embodiment. Some of the operations include receiving first transformations defined in a first programming language, receiving second transformations defined in a second programming language, associating the first transformations with the second transformations in a data structure, defining a macro-transformation in the first programming language, and compiling the macro-transformation to generate source code for the macro-transformation in the second programming language, according to one embodiment. The development system deploys the source code or executable code for the macro-transformation in the second programming language to one or more computing systems that represent a production computing environment, according to one embodiment. In the production computing environment, one or more computing systems receive user data or software system data, apply the macro-transformations to the user data and/or software system data, and provide personalized user experiences and/or other statistical information useful for improving the operation of the one or more software systems, according to one embodiment. These and other embodiments are disclosed in more detail below.

FIG. 1 illustrates an example of a development system 100 configured to facilitate developing and deploying data science transformations (hereafter "transformations") from a development computing environment to a production computing environment, according to one embodiment. The development system 100 includes a development computing environment 110, a production computing environment 130, a client system 140, a client system 150, and a mobile device 160, for developing and deploying transformations, according to one embodiment. The development computing environment 110 is communicatively coupled to the production computing environment 130 through a network 101A, via communications channels 102, 103, and 104, according to one embodiment. The production computing environment 130 is communicatively coupled to one or more of the client system 140, the client system 150, and the mobile device 160, through a network 101B, via communications channels 105, 106, 107, 108, and 109, to deliver software services that are at least partially based on one or more macro-transformations, according to one embodiment. The network 101A and 101B can be a single network, separate networks and can include one or more intranets and/or the Internet, according to one embodiment.

The development computing environment 110 represents a distributed or centralized computing environment comprising one or more computing systems that can be used by one or more data scientists or other developers to define a transformations library, to develop macro-transformations, and/or to generate source code or machine code that can be executed in the production computing environment 130, according to one embodiment. The development computing environment 110 includes a text editor 111, a hybrid library 112, a macro-transformation 113, and a compiler 114, according to one embodiment.

The text editor 111 is configured to receive source code from one or more users to enable defining, connecting, and/or defining relationships between one or more transformations in a first programming language (e.g., Python), according to one embodiment. The text editor 111 can be a word processor, a text editor, or a programming language interpreter (e.g., source code editor) that verifies programming language syntax in batch mode or in real-time mode to indicate to a developer that the that all or part of the syntax of the source code entered is recognized or is recognizable as part of one or more programming languages, according to one embodiment.

The hybrid library 112 enables data scientists and other users to generate target device code (e.g., source code and/or machine code) in programming languages other than the development programming language, according to one embodiment. The hybrid library 112 includes the association of transformations in the development programming language (e.g., Python) with transformations in the production programming language (e.g., Java, JSON ("JavaScript Object Notation"), JavaScript, a proprietary language, etc.), according to one embodiment. The hybrid library 112 is populated with or includes first atomic transformations 115, second atomic transformations 116, a transformations data structure 117, and operators 124, according to one embodiment.

The first atomic transformations 115 represent base classes or base definitions of data transformations in a first programming language, according to one embodiment. The first programming language is Python or another high-level programming language, according to one embodiment. The development computing environment 110 receives the first atomic transformations 115 from a user through the text editor 111 and/or by transferring the first atomic transformations 115 to the development computing environment 110 over the network 101A and/or through one or more other computer-readable media, according to one embodiment. The first atomic transformations 115 are transformations that are generally irreducible units that are written in a first programming language (e.g., the development programming language), according to one embodiment.

Examples of the first atomic transformations 115 include one or more of a variety of data transformations that can be used to transform data from a first state or format into a second state or format, according to one embodiment. Examples of the first atomic transformations 115 include, but are not limited to, type casting (e.g., float to integer, Boolean to integer, etc.), categorical variable conversions, principle component decomposition, multiplexing, constants, string operations, logic operations (e.g., NOT, AND, OR, invert, NAND, XOR, etc.), and other basic or foundational data formations as known at the time of filing.

The second atomic transformations 116 represent base classes or base definitions of data transformations in a second programming language, according to one embodiment. The second programming language includes, but is not limited to, one or more of Java, JSON, JavaScript, Google Protocol Buffers, and Apache Script, according to one embodiment. The second programming language is a target language or a language that is interpreted or executed in the production computing environment 130 to provide one or more computing or software services, according to one embodiment. The development computing environment 110 receives the second atomic transformations 116 from a user through the text editor 111 and/or by transferring the second atomic transformations to the development computing environment 110 over the network 101A and/or through one or more other computer-readable media (e.g., a memory stick, a digital optical disk, etc.), according to one embodiment. The second atomic transformations 116 are transformations that are generally irreducible units that are written in the second programming language that is one of production programming languages (e.g., languages that the production computing environment is configured to execute to host an application or service), according to one embodiment. Each one of the second atomic transformations 116 are a mirror transformation of one of the first atomic transformations 115, according to one embodiment. In other words, each one of the second atomic transformations 116 corresponds to a single one of the first atomic transformations 115, so that there is a one-to-one correlation or association between each one of the first atomic transformations 115 and each one of the second atomic transformations, for each particular programming language, according to one embodiment.

In one embodiment, the hybrid library 112 includes one or more sets of second atomic transformations 116 for each target/production programming language. Thus, the second atomic transformations 116 may have a set of atomic transformations in each of Java, JSON, JavaScript, Google Protocol Buffers, Apache Script, and one or more other proprietary or public programming or executable languages, according to one embodiment. Each of the sets of second atomic transformations 116 include a one-to-one correlation with each of the first atomic transformations 115, according to one embodiment.

In one embodiment, the second atomic transformations 116 include configuration parameters for the production computing environment 130, such as settings for configuring a cloud computing environment. Some cloud computing environments enable or require users to configure the number of CPUs, threads, memory allocations, child processes, function definitions, handler descriptions, resource roles, and the like, in order to execute source or executable code in the production computing environment 130. In one embodiment, the second atomic transformations 116 include configuration parameters for the production computing environment 130, to set up physical and/or virtual resources/assets in the production computing environment 130, to execute and/or host the macro-transformation 113, according to one embodiment.

The hybrid library 112 includes a transformations data structure 117 that receives, maintains, and provides relationships between the first atomic transformations 115 and the second atomic transformations 116, according to one embodiment. Transformations data structure 117 is a table, a database, or some other data structure that associates each of the first atomic transformations 115 with each of the second atomic transformations 116, according to one embodiment. As described above, the second atomic transformations 116 can include one or more programming languages associated with the production computing environment 130, hence, the transformations data structure 117 receives, maintains, and provides relationships between a first programming language and one or more second programming languages, according to one embodiment. The transformations data structure 117 includes code in a first programming language that describes each of the first atomic transformations 115, according to one embodiment. The transformations data structure 117 also includes code in one or more second programming languages for the second atomic transformations 116, according to one embodiment.

The programming language representations of the second atomic transformations 116 are functionally equivalent to the programming language representations of the first atomic transformations 115, according to one embodiment. The transformation data structure 117 receives the first and second atomic transformations from one or more data scientists and/or other developers through the text editor 111, according to one embodiment. Alternatively, the hybrid library 112 can receive the first and second atomic transformations via the network 101A and/or through one or more other computer-readable media, according to one embodiment.

The operators 124 are a meta-language that enables use of the hybrid library 112 with the first programming language from the text editors 111, according to one embodiment. For example, the operators 124 receive the operand and return the results for each of the first atomic transformations 115, according to one embodiment. The operators 124 are defined by multiple instructions in the first programming language, like a class or a function, and are sequentially or otherwise logically connected together in source code in the first programming language, in a manner similar to any other function or class used in the first programming language, according to one embodiment. If, for example, one of the first atomic transformations 115 includes a multiplexer transformation, one of the operators 124 can be used as a shorthand to call or make use of the multiplexer transformation without writing out all of the conditional and/or logical connections, instructions, and/or commands in the first programming language that are used to define the multiplexer transformation, according to one embodiment. The operators 124 are shorthand notations used to call or use the first atomic transformations 115, making the first programming language a domain specific language for the production computing environment 130, according to one embodiment. Because the operators 124 are defined and used in the first programming language, to facilitate use of the first programming language, the operators 124 act as a meta-language for the first programming language, according to one embodiment.

The hybrid library 112 enables the compiler 114 and/or other parts of the development computing environment 110 to define the relational complexities of a macro-transformation with base building blocks, to reduce the risk of functional loss of the macro-transformation after compilation or translation, according to one embodiment.

The macro-transformation 113 represents a macro-transformation that provides a software service or that supports providing a software service from the production computing environment 130, according to one embodiment. Macro is an adjective meaning large-scale or overall, and macro-transformation is used to distinguish the macro-transformation from the atomic transformations, according to one embodiment. The macro-transformation 113 is intended to be interpreted as a combination or conglomerate of one or more less complicated transformations, according to one embodiment. In other words, the macro-transformation 113 includes one or more series, parallel, conditional, or otherwise logically connected atomic transformations 118, according to one embodiment. The macro-transformation 113 is a data pipeline or a chain of processing elements (e.g., processes, threads, co-routines, functions, etc.) arranged so that the output of some of the transformations are input to other transformations, according to one embodiment. The atomic transformations 118 include first atomic transformations 115, and/or one or more encapsulated configurations of the first atomic transformations 115, according to one embodiment. The atomic transformations 118 include a configuration 119 that includes, but is not limited to, node definitions and edge definitions (e.g., for a directed graph), conditional operations for the atomic transformations 118 (e.g., based on the state of the operand and/or the context of use of the macro-transformation 113), and the like, according to one embodiment. The macro-transformation 113 is defined by macro-transformation source code 123 generated by one or more data scientists or other developers through the text editor 111 and/or is received by the development computing environment 110 through one or more computer-readable media and/or through the network 101A, according to one embodiment. The macro-transformation source code 123 includes the operators 124 and/or uses one or more other techniques to incorporate the features and/or functionality of the hybrid library 112 into the macro-transformation source code 123, according to one embodiment.

The development computing environment 110 includes a compiler 114 that transforms the macro-transformation source code 123 from the programming language of the development computing environment 110 (e.g., a first programming language) into a programming language for the production computing environment 130 (e.g., a second programming language), according to one embodiment. The compiler 114 receives the macro-transformation source code 123 and converts the macro-transformation source code 123 into one or more of a development environment executable code 120, a production environment source code 121, and a production environment executable code 122, according to one embodiment.

The development environment executable code 120 is an executable version of the macro-transformation source code 123 in the programming language of the development computing environment 110, according to one embodiment. The programming language of the development computing environment 110 is a high-level programming language that can include one or more tools, packages, and/or other resources that facilitates generation of complex relationships between the first atomic transformations 115 to produce the macro-transformation 113, according to one embodiment. The first programming language is Python and one of the packages imported by or used in the macro-transformation source code 123 is Panda, a Python data analysis library, according to one embodiment. In one embodiment, the development environment executable code 120 includes one or more Python formats/extensions, such as .pyc, .py, .exe, and the like.

The production environment source code 121 is a translation of the macro-transformation source code 123 into the programming language of the production computing environment 130, which preserves the intended function of the macro-transformation 113 in a different language and for execution in another computing environment, according to one embodiment. The compiler 114 uses the hybrid library 112 to process the macro-transformation source code 123 and to generate the production environment source code 121, in a manner that preserves the configuration and functionality of the first atomic transformations 115 that define the macro-transformation 113, according to one embodiment. The production environment source code 121 is source code in the programming language of the production computing environment 130 and is based on the programming language used to define the second atomic transformations 116, according to one embodiment. Examples of the programming language of the production computing environment 130 include, but are not limited to, Java, JSON, JavaScript, Google Protocol Buffers, and Apache Thrift, according to one embodiment. The production environment source code 121 can include one or more of a variety of formats and/or extensions that include, but are not limited to, .json, .js, .java, and the like, according to one embodiment.

The programming languages of the production computing environment 130 enable the production computing environment 130 to host the macro-transformation 113 to provide services to users, and/or one or more software applications, according to one embodiment.

The compiler 114 is configured to compile the production environment source code 121 into a production environment executable code 122, for execution in the production computing environment 130, according one to embodiment. The compiler 114 applies one or more of the scanner, a parser, an intermediate code generator, and/or an optimizer to convert the production environment source code 121 into the production environment executable code 122, according to one embodiment. The production environment executable code 122 can include one or more of a variety of formats and/or extensions that include, but are not limited to, .exe, .json, .js, .java, and the like, according to one embodiment.

The compiler 114 injects one or more parts of the first programming language from the macro-transformation source code 123 into portions of the second programming language in the production environment source code 121, according to one embodiment. In one embodiment, the regular expression portions of each atomic transformation is the bridge between the first programming language and the second programming language. By injecting the regular expression from the first programming language into the second programming language, the second programming language runs in the same way that the first programming language runs, upon execution, according to one embodiment.

After the compiler 114 compiles the macro-transformation source code 123, the development computing environment 110 deploys one or more files to the production computing environment 130, according to one embodiment. In one embodiment, the development computing environment 110 transfers the production environment source code 121 to the production computing environment 130 for execution to support hosting one or more services. In another embodiment, the development computing environment 110 distributes/transfers the production environment executable code 122 to the production computing environment 130 for execution to host one or more software services, according to one embodiment.

The production computing environment 130 can include one or more of a variety of configurations with respect to public access, according to one embodiment. The production computing environment 130 can be within an intranet, can be hosted on the Internet, be accessible to the public at large, and/or can be selectively accessible by the public, according to one embodiment. The production computing environment 130 receives a version of the macro-transformation 113 to enable the production computing environment 130 to provide or support one or more software services using the macro-transformation 113, in a programming language that is supported by the production computing environment 130, according to one embodiment. In one embodiment, the production computing environment 130 receives the production environment executable code 122 for execution within the production computing environment 130, but the production computing environment 130 can alternatively receive the production environment source code 121 for interpretation/execution by the production computing environment 130, according to one embodiment. Advantageously, because the compiler 114 uses the hybrid library 112 to generate the production environment source code 121 on a transformation-by-transformation basis, the production environment source code 121 and the production environment executable code 122 maintain relational complexity between transformations in the pipeline of the macro-transformation 113 to ensure proper translation and functionality encapsulated by the chaining of multiple low-level transformations, according to one embodiment.

The production computing environment 130 includes one or more of a distributed computing environment 131 and a centralized computing environment 132, according to one embodiment. The distributed computing environment 131 spreads information processing between multiple computing systems, e.g., such as cloud computing, according to one embodiment. The centralized computing environment 132 provides processing of operands and results for the macro-transformation 113 on a single service or on one or more centrally located computing systems, according to one embodiment. The distributed computing environment 131 and/or the centralized computing environment 132 execute the production environment executable code 122 to provide one or more software services based on the macro-transformation 113, according to one embodiment.

The distributed computing environment 131 optionally includes or hosts a software system 133 to provide and/or to support one or more software services, according to one embodiment. The software system 133 can be, but is not limited to, one or more of a tax return preparation system, a personal financial management system, a business financial management system, media streaming system, a social network system, an advertising system, a software system that analyzes user data to determine likely user behavior/preferences, and the like. The centralized computing environment 132 optionally includes a software system 134 that can include one or more of the software systems or functions described for the software system 133, according to one embodiment.

In one embodiment, the software system 133 and/or the software system 134 are selected from a group of software systems that include, but are not limited to, one or more of a tax return preparation system, a personal financial management system, and a business/professional financial management system. The software system 133 and/or the software system 134 apply the services of the macro-transformation to encourage users to perform one or more actions towards becoming a customer of or towards becoming a revenue generating user of the software system(s), according to one embodiment. The one or more actions can include, but are not limited to, performing one or more actions towards becoming a paying customer of the software system, selecting a hyperlink, reading an email message, remaining logged into a user session in the software system, progressing through one or more menus, submitting personal or financial information to the software system, filing a tax return, returning to a user session in the software system, ignoring an email message, not returning to a user session in the software system, not progressing through a user interface flow, not filing a tax return, and/or not interacting with a user interface for the software system, according to one embodiment, according to one embodiment.

The production computing environment 130 and/or one or more of the software system 133 and the software system 134 applies one or more user characteristics to the macro-transformation 113 (e.g., the production environment source code 121 or the production environment executable code 122) to generate one or more results or recommendations used by the production computing environment to provide one or more software services, according to one embodiment. The user characteristics are represented by user characteristics data. The user characteristics data includes information gathered directly from one or more external sources such as, but not limited to, a payroll management company, state agencies, federal agencies, employers, military records, public records, private companies, and the like, according to one embodiment. Additional examples of the user characteristics (represented by the user characteristics data) include, but are not limited to, data indicating user computing system characteristics (e.g., browser type, applications used, device type, operating system, etc.), data indicating time-related information (hour of day, day of week, etc.), data indicating geographical information (latitude, longitude, designated market area region, etc.), data indicating external and independent marketing segments, data identifying an external referrer of the user (e.g., paid search, add click, targeted email, etc.), data indicating a number of visits made to a service provider website, a user's name, a Social Security number, government identification, a driver's license number, a date of birth, an address, a zip code, a home ownership status, a marital status, an annual income, a job title, an employer's address, spousal information, children's information, asset information, medical history, occupation, information regarding dependents, salary and wages, interest income, dividend income, business income, farm income, capital gain income, pension income, IRA distributions, unemployment compensation, education expenses, health savings account deductions, moving expenses, IRA deductions, student loan interest deductions, tuition and fees, medical and dental expenses, state and local taxes, real estate taxes, personal property tax, mortgage interest, charitable contributions, casualty and theft losses, unreimbursed employee expenses, alternative minimum tax, foreign tax credit, education tax credits, retirement savings contribution, child tax credits, residential energy credits, and any other information that is currently used, that can be used, or that may be used in the future, in a financial system, or in the preparation of a user's tax return, according to various embodiments.

The centralized computing environment 132 operates on an intranet to provide backend analytics processing for a software services provider, according to one embodiment. The centralized computing environment 132 executes the production environment source code 121 and/or the production environment executable code 122 by receiving data (e.g., user characteristics data) from one or more software systems (e.g., a tax return preparation system and a financial management system), determining likelihoods of one or more user behaviors or preferences, and provides the determined likelihoods to the one or more software systems, as a decision engine, according to one embodiment. In one embodiment, the centralized computing environment 132 includes a content management engine (e.g., a decision engine) that receives executable versions of the macro-transformation 113, integrates the macro-transformation 113 into hardware and/or software production configurations, and provides live/production software services to customers based on the received versions of the macro-transformation 113. Using the centralized computing environment 132 as a content management engine or intermediary deployment platform enables data scientist to indirectly deploy new or updated macro-transformations 113 to the public, through the centralized computing environment 132, according to one embodiment. This configuration removes the need of having software engineers verify model transformations developed by data scientists (e.g., removes a potential deployment delay), while concurrently providing a tested, robust, reliable system for integrating macro-transformation 113 and/or macro-transformation source code 123 (or a version thereof) into a live/production software service environment, according to one embodiment. Advantageously, the development computing environment 110 in combination with the production computing environment 130, as disclosed, enable faster deployment of a new or updated macro-transformation, with visibility into the intermediate model translations/transcompilation, to enable the preservation of relational complexity between the atomic transformations 118 that make up the macro-transformation 113, according to one embodiment.

The production computing environment 130 uses the production environment source code 121 and/or the production environment executable code 122 to provide software services to one or more users represented by the client system 140, the client system 150, and the mobile device 160, according to one embodiment.

The client system 140 includes a web browser 141 used to access one or more pages 142 to enable one or more users to interact with the production computing environment 130, according to one embodiment.

The client system 150 includes a client application 151 installed on the client system 150, to enable a user to interact with the production computing environment 130, according to one embodiment. In one embodiment, the client system 150 is a desktop computing system, according to one embodiment.

The mobile device 160 includes a mobile web browser 161 and/or an application ("app") 162 for remotely accessing and interacting with the production computing environment 130, according to one embodiment. In one embodiment, the mobile device 160 is a tablet, a smart phone, a laptop, a personal digital assistant, and the like, according to various embodiments.

The client system 140, the client system 150, and the mobile device 160 are representative of one or more of a plurality of systems/devices with which users of the production computing environment 130 can use to access, interact with, and receive services from the production computing environment 130, according to one embodiment.

Figure 2:
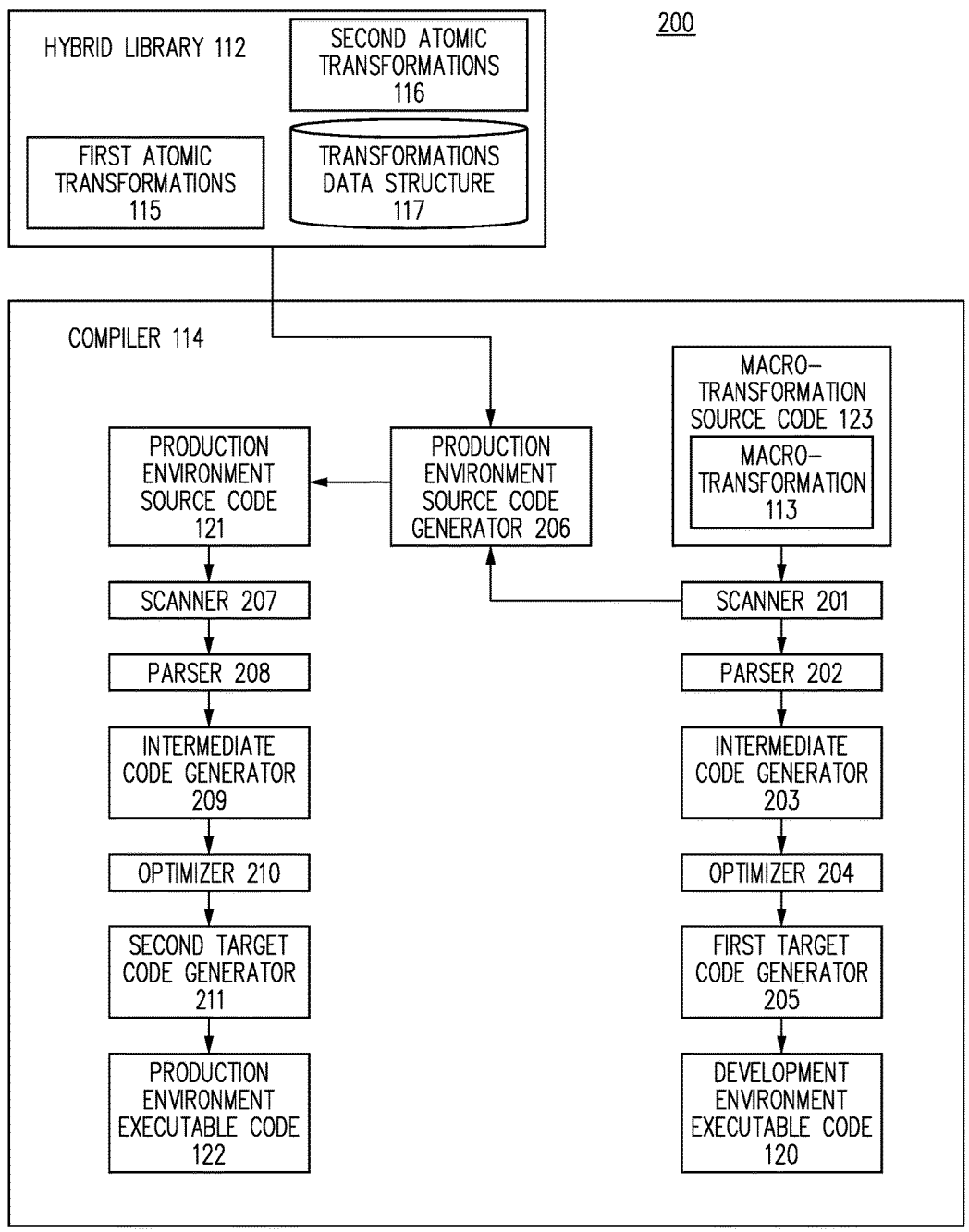
FIG. 2 is a diagram of an example implementation of a compiler for the development system of FIG. 1, in accordance with one embodiment.

FIG. 2 includes an example of an architecture 200 of the compiler 114, according to one embodiment. The compiler 114 receives the macro-transformation source code 123 that is representative of the macro-transformation 113 in a first programming language (e.g., Python), according to one embodiment. The compiler 114 applies a number processes to the macro-transformation source code 123 to generate the development environment executable code 120, the production environment source code 121, and the production environment executable code 122, according to one embodiment.

To generate the development environment executable code 120, the compiler 114 applies or subjects the macro-transformation source code 123 to one or more of a scanner 201, a parser 202, an intermediate code generator 203, an optimizer 204, and a first target code generator 205, according to one embodiment. The scanner 201 performs lexical analysis to convert sequences of characters into a sequence of tokens (e.g., strings with an identified meaning), according to one embodiment. The parser 202 converts the tokens into a syntax tree that is a tree representation of syntax structure of the source code, according to one embodiment. The intermediate code generator 203 produces an intermediate representation ("IR") of the source code for processing by the optimizer 204. The intermediate representation is a data structure or code and is typically independent of the target language or the source language. The optimizer 204 removes redundant and/or useless code and relocates computations, according to one embodiment. The first target code generator 205 generates assembly code, by performing register allocation, adjusts the code to reduce processor delays, and prepares the optimized code for execution in the target environment, according to one embodiment. The target environment for the development environment executable code 120 is the development computing environment 110, according to one embodiment. The target environment for the development environment executable code 120 is the production computing environment 130, according to one embodiment.

The compiler uses a production environment source code generator 206 to generate the production environment source code 121 from the macro-transformation source code 123, according to one embodiment. The production environment source code generator 206 receives the output of the scanner 201, lexically matches the tokens of the macro-transformation source code 123 with the first atomic transformations 115 within the transformations data structure 117, and identifies the corresponding second atomic transformations 116 that correspond to the atomic transformations of the macro-transformation source code 123, according to one embodiment. In one embodiment, the production environment source code generator 206 performs regular expression matching of parts of the macro-transformation source code 123 using the hybrid library 112, to identify corresponding second atomic transformations 116 in the target programming language, according to one embodiment. In one embodiment, the production environment source code generator 206 receives input from one or more of the scanner 201, the parser 202, and the intermediate code generator 203 to identify which of the second atomic transformations 116 are applicable to the production environment source code 121 and to determine the configuration, logical connections, and architecture of the second atomic transformations 116 for the production environment source code 121, according to one embodiment.

The compiler 114 converts the production environment source code 121 into the production environment executable code 122, according to one embodiment. The compiler 114 applies or subjects the production environment source code 121 to one or more of a scanner 207, a parser 208, an intermediate code generator 209, an optimizer 210, and a second target generator 211, to produce the production environment executable code 122, according to one embodiment. The scanner 207, parser 208, intermediate code generator 209, and optimizer 210 perform similar functions as the scanner 201, parser 202, intermediate code generator 203, and optimizer 204, but for one or more target programming languages (e.g., the programming language for the production computing environment 130), according to one embodiment. The second target generator 211 performs a similar function as the first target code generator 205, but for one or more target programming languages, according to one embodiment.

Figure 3:
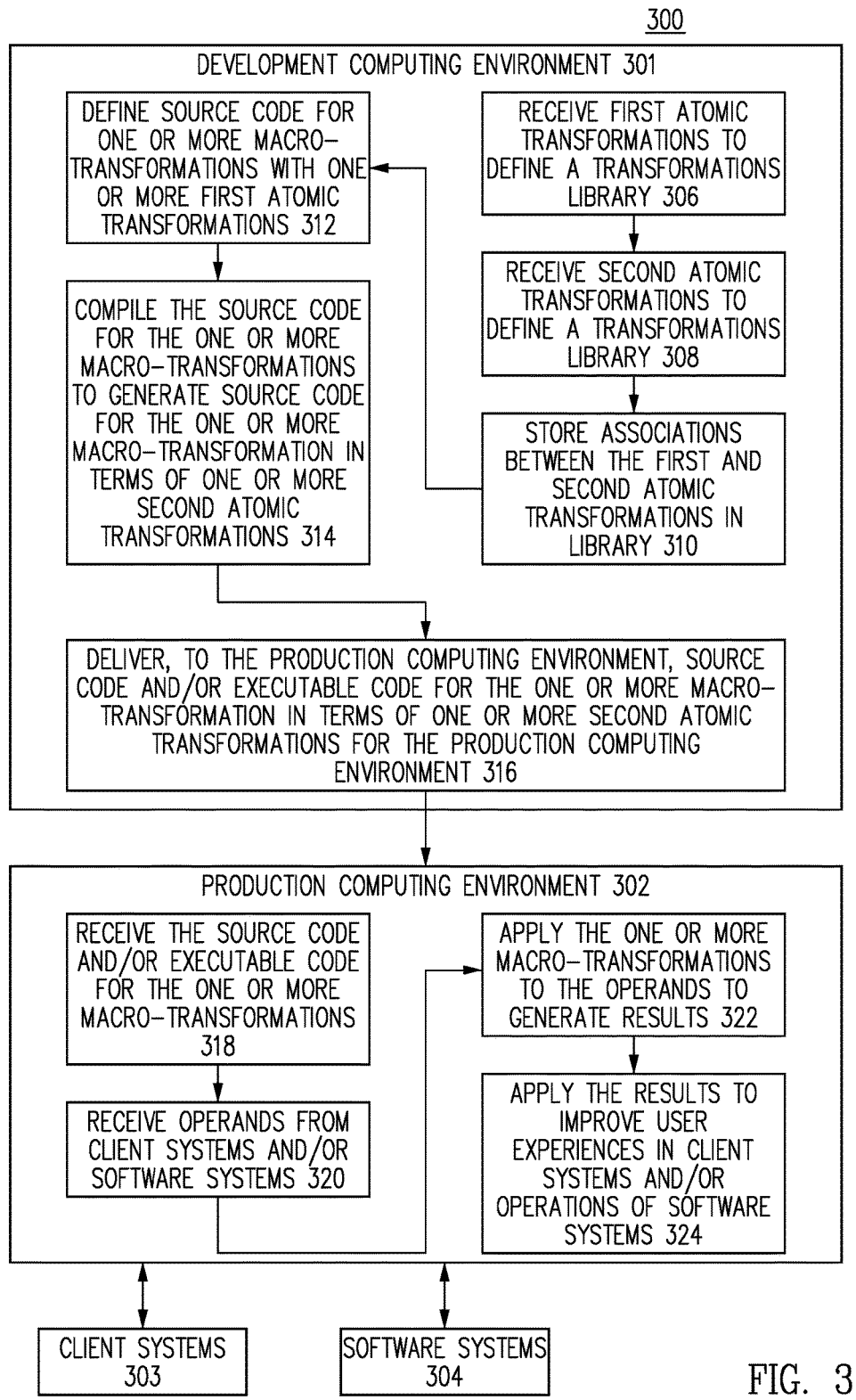
FIG. 3 is a flow diagram of an example of a process for developing and deploying data transformations, in accordance with one embodiment.

FIG. 3 includes an example of a process 300 for developing and deploying data science transformations from a development computing environment into a production computing environment, according to one embodiment. The process includes a number of operations that occur between a development computing environment 301, a production computing environment 302, client systems 303, and software systems 304, according to one embodiment.

At operation 306, the development computing environment 301 receives first atomic transformations to define a transformations library, according to one embodiment. Receiving first atomic transformations includes receiving instructions from a user through a text editor, in a first programming language, according to one embodiment.

At operation 308, the development computing environment 301 receives second atomic transformations to define a transformations library, according to one embodiment.

At operation 310, the development computing environment 301 stores associations between the first and second atomic transformations in the transformations library, according to one embodiment.

At operation 312, the development computing environment 301 defines source code for one or more macro-transformations with one or more first atomic transformations, according to one embodiment.

At operation 314, the development computing environment 301 compiles the source code for the one or more macro-transformations to generate source code for the one or more macro-transformation in terms of one or more second atomic transformations, according to one embodiment.

At operation 316, the development computing environment 301 delivers, to the production computing environment 302, source code and/or executable code for the one or more macro-transformation in terms of one or more second atomic transformations for the production computing environment 302, according to one embodiment.

At operation 318, the production computing environment 302 receives the source code and/or executable code for the one or more macro-transformations, according to one embodiment.

At operation 320, the production computing environment 302 receives operands from client systems 303 and/or software systems 304, according to one embodiment.

At operation 322, the production computing environment 302 applies the one or more macro-transformations to the operands to generate results, according to one embodiment. In one embodiment, the results are likelihoods or probabilities that one or more actions will occur, that one or more characteristics exist, that one or more events will occur, that a user will prefer one or more user experiences over another user experience, and the like, according to one embodiment.

At operation 324, the production computing environment 302 applies the results to improve user experiences in the client systems 303 and/or operations of software systems 304, according to one embodiment.

Figure 4:
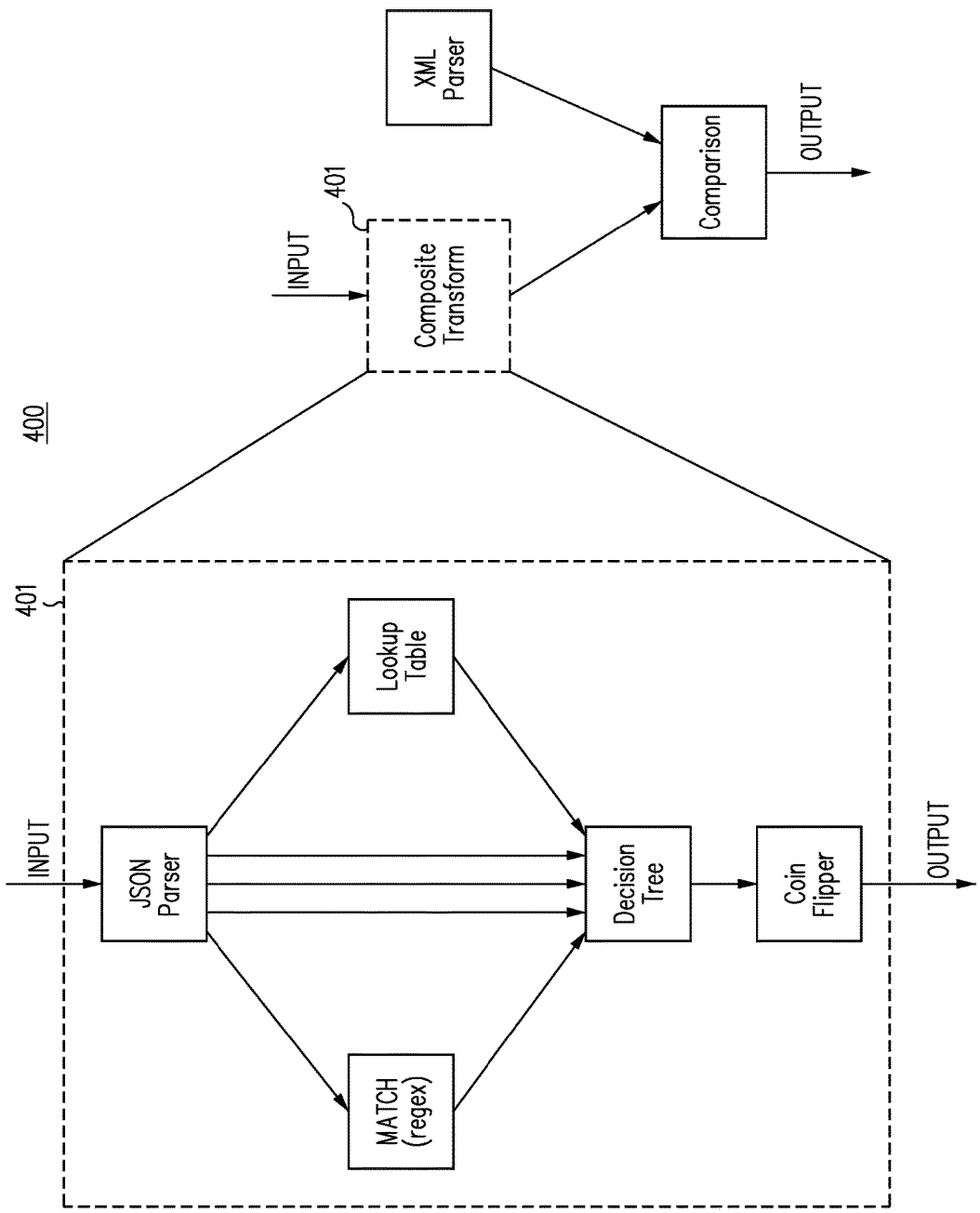
FIG. 4 is a block diagram of an example of encapsulation with data transformations, in accordance with one embodiment.

FIG. 4 includes an example of a diagram 400 that illustrates an example of encapsulating intermediate transformations into an example of a macro-transformation, according to one embodiment. The diagram 400 includes a macro-transformation 401 that is part of a process that receives an input, performs an operation on the input, compares the input to some extended markup language ("XML") code, and provides an output. The macro-transformation 401 is illustrated in an expanded view to illustrate that the macro-transformation 401 can include intermediate transformations that parse an input (with a JSON parser), perform a regular expression comparison, compare the input to a lookup table, apply the parsed input to a decision tree with lookup table results and with a regular expression comparison result, and applies the decision tree result to weight or affect a random number generator, according to one embodiment. Each of the intermediate transformations in the macro-transformation 401 can include one or more atomic transformations in the programming language of the development computing environment, according to one embodiment.

Figure 5B:

FIGS. 5A and 5B illustrate an example of a functional diagram 500 for applying a hybrid library to convert a transformation in one programming language (e.g., Python) into a transformation in another programming language (e.g., Java), according to one embodiment.

Block 502 displays instructions for importing an example of a hybrid library "hippo" and displays instructions for initializing or using one atomic transformation (e.g., a multiplexer transformation), according to one embodiment. The transformation (or transformation object) is an atomic transformation for performing a multiplexer operation, according to one embodiment. If the operand for the transformation is "hello", then the multiplexer outputs "world". If the operand for the transformation is something other than "hello", then the multiplexer outputs "goodbye".

The example hybrid library "hippo" is an implementation of the hybrid library 112 that is shown in FIG. 1, according to one embodiment. In addition to associating atomic transformations in a first programming language with atomic transformations in a second programming language, the hybrid library provides a metalanguage (e.g., operators 124 shown in FIG. 1) for logically, operably, conditionally, or otherwise connecting one or more atomic transformations to each other in the first programming language, according to one embodiment. Examples of atomic transformations in block 502 include Match, Constant, and Ternary (implemented to perform multiplexer operation), according to one embodiment. The hybrid library defines the multiplexer transformation in Python (e.g., the first programming language) with a number of chain ( ) and merge ( ) functions surrounding the regular expression function match ( ), according to one embodiment.

Block 504 displays the definition of the multiplexer transformation by displaying the transformation object "x", according to one embodiment.

Block 506 displays instructions for defining a sample operand "input", and applies the sample transformation "x" to the operand "input", according to one embodiment. Block 506 displays the results of applying the multiplexer transformation to the operand "input", according to one embodiment.

Block 508 displays an example instruction to compile the multiplexer transformation "x" from a first programming language (i.e., Python) into a source code file "patent.json" in a second programming language (i.e., Java), according to one embodiment.

Block 510 displays parts of the source code file "patent.json" that is in the second programming language to show how the compiler used the hybrid library to convert the multiplexer transformation "x" from Python to Java, according to one embodiment.

Although the functional diagram 500 shows example instructions for defining a base/atomic transformation in a first programming language and in the second programming language, these illustrated examples are presented purely as non-limiting examples of one implementation of one transformation, in accordance with one embodiment of the disclosure.

Figure 6A:
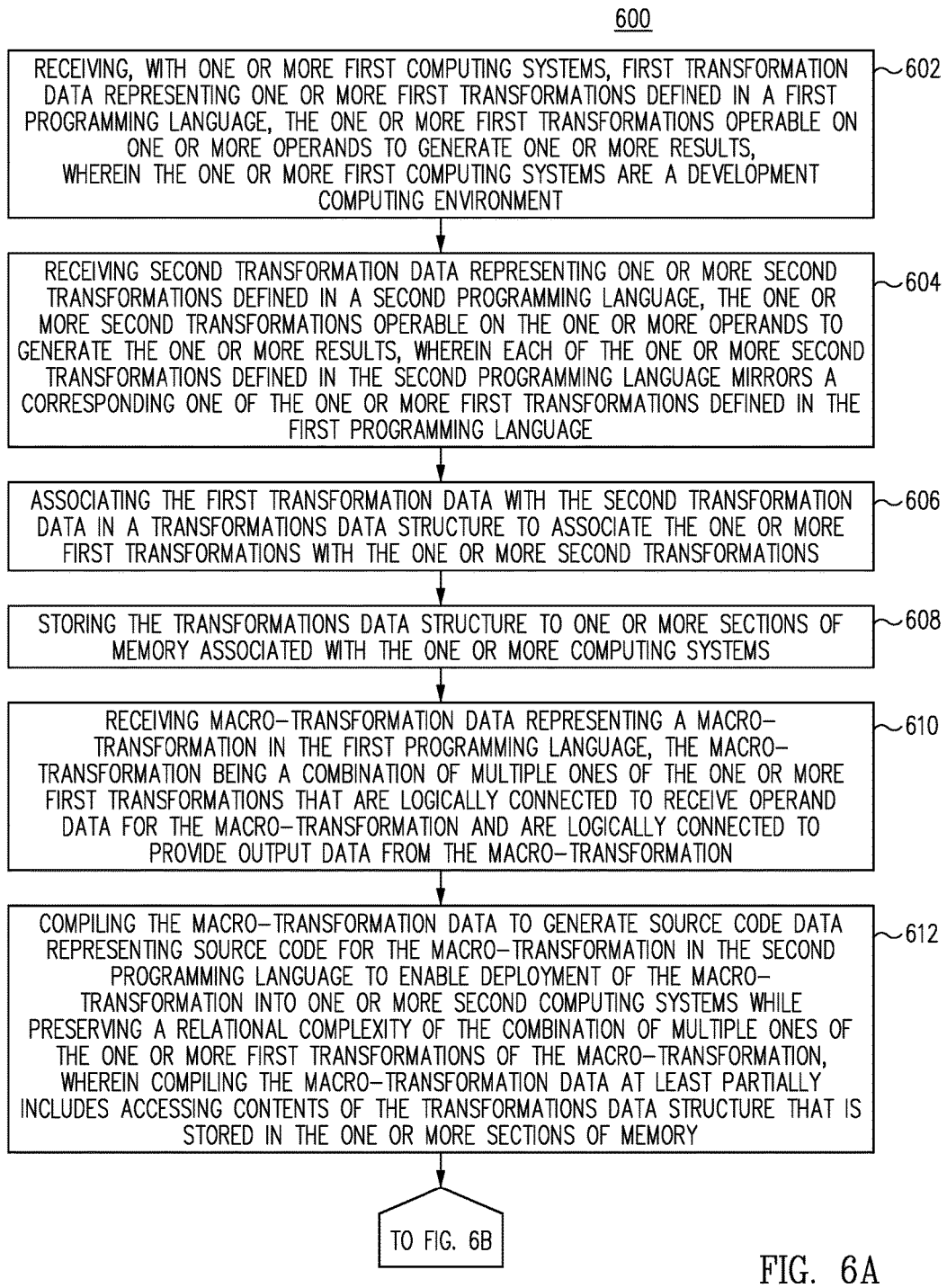
FIGS. 6A and 6B are an example of a flow diagram of a process for developing and deploying data transformations, according to one embodiment.
Figure 6B:
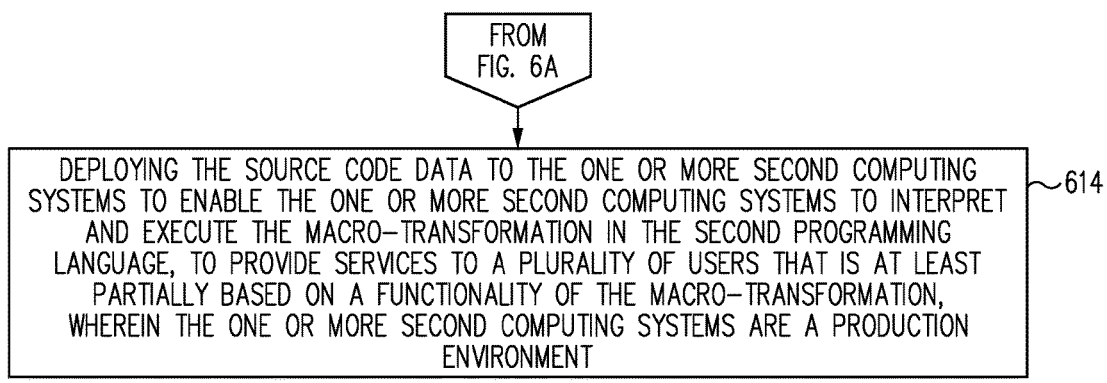

FIGS. 6A and 6B illustrate an example flow diagram of a process 600 for developing and deploying data science transformations from a development computing environment into a production computing environment, according to one embodiment.

At operation 602, the process includes receiving, with one or more first computing systems, first transformation data representing one or more first transformations defined in a first programming language, the one or more first transformations operable on one or more operands to generate one or more results, wherein the one or more first computing systems are a development computing environment, according to one embodiment.

At operation 604, the process includes receiving second transformation data representing one or more second transformations defined in a second programming language, the one or more second transformations operable on the one or more operands to generate the one or more results, wherein each of the one or more second transformations defined in the second programming language mirrors a corresponding one of the one or more first transformations defined in the first programming language, according to one embodiment.

At operation 606, the process includes associating the first transformation data with the second transformation data in a transformations data structure to associate the one or more first transformations with the one or more second transformations, according to one embodiment.

At operation 608, the process includes storing the transformations data structure to one or more sections of memory associated with the one or more computing systems, according to one embodiment.

At operation 610, the process includes receiving macro-transformation data representing a macro-transformation in the first programming language, the macro-transformation being a combination of multiple ones of the one or more first transformations that are logically connected to receive operand data for the macro-transformation and are logically connected to provide output data from the macro-transformation, according to one embodiment.

At operation 612, the process includes compiling the macro-transformation data to generate source code data representing source code for the macro-transformation in the second programming language to enable deployment of the macro-transformation into one or more second computing systems while preserving a relational complexity of the combination of multiple ones of the one or more first transformations of the macro-transformation, wherein compiling the macro-transformation data at least partially includes accessing contents of the transformations data structure that is stored in the one or more sections of memory, according to one embodiment.

At operation 614, the process includes deploying the source code data to the one or more second computing systems to enable the one or more second computing systems to interpret and execute the macro-transformation in the second programming language to provide services to a plurality of users that is at least partially based on a functionality of the macro-transformation, wherein the one or more second computing systems are a production environment, according to one embodiment.

By providing a development system for developing and deploying data science transformations from a development computing environment into a production computing environment, implementation of embodiments of the present disclosure allows for significant improvement to the fields of data analytics, user experience personalization, electronic tax return preparation, financial software systems, data collection, and data processing, according to one embodiment. As one illustrative example, by providing a development system for developing and deploying data science transformations from a development computing environment into a production computing environment, embodiments of the present disclosure allow data scientists and other developers to develop and deploy transformations with fewer processing cycles and less communications bandwidth because the developers are able to generate the target files from a single command (e.g., "compile") rather than using one or more additional compiler or conversion tools. Fewer processing cycles and less communications bandwidth is also used because the developers can skip, potentially redundant, steps for configuring target/production computing environments by embedding resource configuration settings in the hybrid library so that the configuration settings are generating when the source code is compiled. This reduces processing cycles and communications bandwidth because the developers do not need to access and/or manipulate the target/production computing environments, which are generally accessed through remote network connections. As a result, embodiments of the present disclosure allow for improved processor performance, more efficient use of memory access and data storage capabilities, reduced communication channel bandwidth utilization, and therefore faster communications connections.

In accordance with an embodiment, a computer system implemented method deploys data science transformations from a development computing environment into a production computing environment. The method includes receiving, with one or more first computing systems, first transformation data representing one or more first transformations defined in a first programming language, the one or more first transformations operable on one or more operands to generate one or more results, according to one embodiment. The one or more first computing systems are a development computing environment, according to one embodiment. The method includes receiving second transformation data representing one or more second transformations defined in a second programming language, the one or more second transformation operable on the one or more operands to generate the one or more results, according to one embodiment. Each of the one or more second transformations defined in the second programming language mirrors a corresponding one of the one or more first transformations defined in the first programming language, according to one embodiment. The method includes associating the first transformation data with the second transformation data in a transformations data structure to associate the one or more first transformations with the one or more second transformations, according to one embodiment. The method includes storing the transformations data structure to one or more sections of memory associated with the one or more computing systems, according to one embodiment. The method includes receiving macro-transformation data representing a macro-transformation in the first programming language, the macro-transformation being a combination of multiple ones of the one or more first transformations that are logically connected to receive operand data for the macro-transformation and are logically connected to provide output data from the macro-transformation, according to one embodiment. The method includes compiling the macro-transformation data to generate source code data representing source code for the macro-transformation in the second programming language to enable deployment of the macro-transformation into one or more second computing systems while preserving a relational complexity of the combination of multiple ones of the one or more first transformations of the macro-transformation, according to one embodiment. Compiling the macro-transformation data at least partially includes accessing contents of the transformations data structure that is stored in the one or more sections of memory, according to one embodiment. The method includes deploying the source code data to the one or more second computing systems to enable the one or more second computing systems to interpret and execute the macro-transformation in the second programming language to provide services to a plurality of users that is at least partially based on a functionality of the macro-transformation, according to one embodiment. The one or more second computing systems are a production environment, according to one embodiment.

In accordance with an embodiment, a computer system implemented method deploys data science transformations from a development computing environment into a production computing environment. The method includes receiving, with one or more computing systems, macro-transformation data representing a macro-transformation in a first programming language, the macro-transformation being a combination of multiple ones of one or more first transformations that are logically connected to receive operand data for the macro-transformation and are logically connected to provide output data from the macro-transformation, according to one embodiment. The macro-transformation data includes one or more instructions for operators that reference a hybrid library that associates the one or more first transformations in the first programming language with one or more second transformations in a second programming language, according to one embodiment. The method includes compiling the macro-transformation data to generate source code data representing source code for the macro-transformation in the second programming language to enable deployment of the macro-transformation into one or more second computing systems while preserving a relational complexity of the combination of multiple ones of the one or more first transformations of the macro-transformation, according to one embodiment. Compiling the macro-transformation data at least partially includes accessing the hybrid library, according to one embodiment. The method includes deploying the source code data to the one or more second computing systems to enable the one or more second computing systems to interpret and execute the macro-transformation in the second programming language to provide services to a plurality of users that is at least partially based on a functionality of the macro-transformation, according to one embodiment. The one or more second computing systems are a production environment.

In accordance with an embodiment a non-transitory computer-readable medium has instructions which, when executed by one or more processors, performs a method for deploying data science transformations from a development computing environment into a production computing environment. The method includes receiving, with one or more first computing systems, first transformation data representing one or more first transformations defined in a first programming language, the one or more first transformations operable on one or more operands to generate one or more results, according to one embodiment. The one or more first computing systems are a development computing environment, according to one embodiment. The method includes receiving second transformation data representing one or more second transformations defined in a second programming language, the one or more second transformation operable on the one or more operands to generate the one or more results, according to one embodiment. Each of the one or more second transformations defined in the second programming language mirrors a corresponding one of the one or more first transformations defined in the first programming language, according to one embodiment. The method includes associating the first transformation data with the second transformation data in a transformations data structure to associate the one or more first transformations with the one or more second transformations, according to one embodiment. The method includes storing the transformations data structure to one or more sections of memory associated with the one or more computing systems, according to one embodiment. The method includes receiving macro-transformation data representing a macro-transformation in the first programming language, the macro-transformation being a combination of multiple ones of the one or more first transformations that are logically connected to receive operand data for the macro-transformation and are logically connected to provide output data from the macro-transformation, according to one embodiment. The method includes compiling the macro-transformation data to generate source code data representing source code for the macro-transformation in the second programming language to enable deployment of the macro-transformation into one or more second computing systems while preserving a relational complexity of the combination of multiple ones of the one or more first transformations of the macro-transformation, according to one embodiment. Compiling the macro-transformation data at least partially includes accessing contents of the transformations data structure that is stored in the one or more sections of memory, according to one embodiment. The method includes deploying the source code data to the one or more second computing systems to enable the one or more second computing systems to interpret and execute the macro-transformation in the second programming language to provide services to a plurality of users that is at least partially based on a functionality of the macro-transformation, according to one embodiment. The one or more second computing systems are a production environment.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various users under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating," "accessing," "adding," "aggregating," "alerting," "applying," "analyzing," "associating," "calculating," "capturing," "categorizing," "classifying," "comparing," "creating," "defining," "detecting," "determining," "distributing," "eliminating," "encrypting," "extracting," "filtering," "forwarding," "generating," "identifying," "implementing," "informing," "monitoring," "obtaining," "posting," "processing," "providing," "receiving," "requesting," "saving," "sending," "storing," "substituting," "transferring," "transforming," "transmitting," "using," etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGs., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computer system implemented method for deploying data science transformations from a development computing environment into a production computing environment, comprising:
    receiving, with one or more first computing systems, first transformation data representing one or more first transformations defined in a first programming language, the one or more first transformations operable on one or more operands to generate one or more results,
        wherein the one or more first computing systems are a development computing environment;
    receiving second transformation data representing one or more second transformations defined in a second programming language, the one or more second transformations operable on the one or more operands to generate the one or more results,
        wherein each of the one or more second transformations defined in the second programming language mirrors a corresponding one of the one or more first transformations defined in the first programming language,
        further wherein the second transformation data includes one or more configuration parameters for configuring physical and/or virtual resources to execute one or more transformations;
    associating the first transformation data with the second transformation data in a transformations data structure to associate the one or more first transformations with the one or more second transformations;
    storing the transformations data structure to one or more sections of memory associated with the one or more computing systems;
    receiving macro-transformation data representing a macro-transformation in the first programming language, the macro-transformation being a combination of multiple ones of the one or more first transformations that are logically connected to receive operand data for the macro-transformation and are logically connected to provide output data from the macro-transformation;

compiling the first programming language macro-transformation data to generate executable code for the macro-transformation in the second programming language to enable deployment of the macro-transformation into one or more second computing systems while preserving a relational complexity of the combination of multiple ones of the one or more first transformations of the macro-transformation, wherein compiling the macro-transformation data at least partially includes accessing contents of the transformations data structure that is stored in the one or more sections of memory; and deploying the executable code to the one or more second computing systems to enable the one or more second computing systems to interpret and execute the macro-transformation in the second programming language to provide services to a plurality of users that is at least partially based on a functionality of the macro-transformation, wherein the one or more second computing systems are the production environment.

2. The computer system implemented method of claim 1, wherein deploying the source code data includes:

compiling the source code data with a compiler for the second programming language to generate an executable file of the second programming language that is an executable version of the macro-transformation; and deploying the executable file to the one or more second computing systems.

3. The computer system implemented method of claim 1, wherein compiling the macro-transformation data to generate source code data representing source code for the macro-transformation in the second programming language includes:

identifying each of the multiple ones of the one or more first transformations of the macro-transformation;

identifying, with the transformations data structure, equivalent ones of the one or more second transformations for each of the multiple ones of the one or more first transformations of the macro-transformation; and generating the source code for the macro-transformation in the second programming language by writing the equivalent ones of the one or more second transformations to a file for the source code.

4. The computer system implemented method of claim 1, wherein the one or more first transformations are each an atomic transformation that is a single irreducible transformation.

5. The computer system implemented method of claim 1, wherein compiling the macro-transformation data concurrently generates an executable file of the first programming language that is an executable version of the macro-transformation.

6. The computer system implemented method of claim 1, wherein at least some of the multiple ones of the one or more first transformations are polymorphic based on a state of the one or more operands that are processed by the macro-transformation, the at least some of the multiple ones of the one or more first transformations selectively providing alternative functionality at least partially based on the one or more operands.

7. The computer system implemented method of claim 1, wherein the relational complexity of the combination of multiple ones of the one or more first transformations of the macro-transformation includes conditional transitions between the multiple ones of the one or more first transformations.

8. The computer system implemented method of claim 1, wherein the relational complexity of the combination of multiple ones of the one or more first transformations of the macro-transformation includes scalability and extensibility of the combination of multiple ones of the one or more first transformations of the macro-transformation.

9. The computer system implemented method of claim 1, wherein the first transformation data is a library of data transformations.

10. The computer system implemented method of claim 1, wherein the macro-transformation includes a directed graph of a plurality of nodes and a plurality of edges, each of the plurality of nodes representing one of the one or more first transformations, each of the plurality of edges representing criteria for traversing from one of the plurality of nodes to another of the plurality of nodes.

11. The computer system implemented method of claim 1, wherein the transformations data structure is part of a library imported into the first programming language to generate the macro-transformation in the second programming language, to enable deployment of the macro-transformation in the one or more second computing systems.

12. The computer system implemented method of claim 1, wherein the one or more second computing systems include a distributed computing environment.

13. The computer system implemented method of claim 1, wherein the one or more second computing systems include a centralized computing environment.

14. The computer system implemented method of claim 1, wherein the one or more second computing systems include a cloud computing environment with dynamically allocable virtual assets.

15. The computer system implemented method of claim 1, wherein the macro-transformation is an analytics model.

16. The computer system implemented method of claim 15, wherein the analytics model identifies user preferences for user experience options in a tax return preparation system that enables personalization of user experiences in the tax return preparation system to increase a likelihood of users performing one or more actions towards filing a tax return with the tax return preparation system.

17. The computer system implemented method of claim 16, wherein the one or more actions towards filing a tax return are selected from a group of actions consisting of:

completing a sequence of questions;

paying for a product within the tax return preparation system;

completing a tax return preparation interview;

completing a tax return preparation session;

filing a tax return from within the tax return preparation system;

entering personal information;

entering credit card information into the tax return preparation system;

transitioning from one user experience page to another user experience page in the tax return preparation system;

logging into the tax return preparation system; and using the tax return preparation system for longer than a predetermined period of time.

18. The computer system implemented method of claim 16, wherein the analytics model identifies user preferences based on one or more user characteristics represented by user characteristics data, the user characteristics data being selected from a group of user characteristics data consisting of:
  data indicating user computing system characteristics;
  data indicating time-related information;
  data indicating geographical information;
  data indicating external and independent marketing segments;
  data identifying an external referrer of the user;
  data indicating a number of visits made to a service provider website;
  data indicating an age of the user;
  data indicating an age of a spouse of the user;
  data indicating a zip code;
  data indicating a tax return filing status;
  data indicating state income;
  data indicating a home ownership status;
  data indicating a home rental status;
  data indicating a retirement status;
  data indicating a student status;
  data indicating an occupation of the user;
  data indicating an occupation of a spouse of the user;
  data indicating whether the user is claimed as a dependent;
  data indicating whether a spouse of the user is claimed as a dependent;
  data indicating whether another taxpayer is capable of claiming the user as a dependent;
  data indicating whether a spouse of the user is capable of being claimed as a dependent;
  data indicating salary and wages;
  data indicating taxable interest income;
  data indicating ordinary dividend income;
  data indicating qualified dividend income;
  data indicating business income;
  data indicating farm income;
  data indicating capital gains income;
  data indicating taxable pension income;
  data indicating pension income amount;
  data indicating IRA distributions;
  data indicating unemployment compensation;
  data indicating taxable IRA;
  data indicating taxable Social Security income;
  data indicating amount of Social Security income;
  data indicating amount of local state taxes paid;
  data indicating whether the user filed a previous years' federal itemized deduction;
  data indicating whether the user filed a previous years' state itemized deduction;
  data indicating whether the user is a returning user to a tax return preparation system;
  data indicating an annual income;
  data indicating an employer's address;
  data indicating contractor income;
  data indicating a marital status;
  data indicating a medical history;
  data indicating dependents;
  data indicating assets;
  data indicating spousal information;
  data indicating children's information;
  data indicating an address;
  data indicating a name;
  data indicating a Social Security Number;
  data indicating a government identification;
  data indicating a date of birth;
  data indicating educator expenses;
  data indicating health savings account deductions;
  data indicating moving expenses;
  data indicating IRA deductions;
  data indicating student loan interest deductions;
  data indicating tuition and fees;
  data indicating medical and dental expenses;
  data indicating state and local taxes;
  data indicating real estate taxes;
  data indicating personal property tax;
  data indicating mortgage interest;
  data indicating charitable contributions;
  data indicating casualty and theft losses;
  data indicating unreimbursed employee expenses;
  data indicating an alternative minimum tax;
  data indicating a foreign tax credit;
  data indicating education tax credits;
  data indicating retirement savings contributions; and
  data indicating child tax credits.

19. A non-transitory computer-readable medium, having instructions which, when executed by one or more processors, performs a method for deploying data science transformations from a development computing environment into a production computing environment, comprising:
  receiving, with one or more first computing systems, first transformation data representing one or more first transformations defined in a first programming language, the one or more first transformations operable on one or more operands to generate one or more results,
    wherein the one or more first computing systems are a development computing environment;
  receiving second transformation data representing one or more second transformations defined in a second programming language, the one or more second transformation operable on the one or more operands to generate the one or more results,
    wherein each of the one or more second transformations defined in the second programming language mirrors a corresponding one of the one or more first transformations defined in the first programming language,
    further wherein the second transformation data includes one or more configuration parameters for configuring physical and/or virtual resources to execute one or more transformations;
  associating the first transformation data with the second transformation data in a transformations data structure to associate the one or more first transformations with the one or more second transformations;
  storing the transformations data structure to one or more sections of memory associated with the one or more computing systems;
  receiving macro-transformation data representing a macro-transformation in the first programming language, the macro-transformation being a combination of multiple ones of the one or more first transformations that are logically connected to receive operand data for the macro-transformation and are logically connected to provide output data from the macro-transformation;
  compiling the macro-transformation data to generate executable code for the macro-transformation in the second programming language to enable deployment of the macro-transformation into one or more second computing systems while preserving a relational complexity of the combination of multiple ones of the one or more first transformations of the macro-transformation, wherein compiling the macro-transformation data at least partially includes accessing contents of the transformations data structure that is stored in the one or more sections of memory; and deploying the executable code to the one or more second computing systems to enable the one or more second computing systems to interpret and execute the macro-transformation in the second programming language to provide services to a plurality of users that is at least partially based on a functionality of the macro-transformation, wherein the one or more second computing systems are a production environment.

20. The non-transitory computer-readable medium of claim 19, wherein the one or more first transformations are each an atomic transformation that is a single irreducible transformation.

21. The non-transitory computer-readable medium of claim 19, wherein the first transformation data is a library of data transformations.

22. The non-transitory computer-readable medium of claim 19, wherein the macro-transformation is an analytics model.

* * * * *